United States Patent [19]

Degen

[11] Patent Number: 5,449,465
[45] Date of Patent: Sep. 12, 1995

[54] FILTRATION METHOD USING A RELATIVE PRESSURE DROP TO INITIATE BACKWASH

[75] Inventor: Peter J. Degen, Huntington, N.Y.

[73] Assignee: Pall Corporation, East Hills, N.Y.

[21] Appl. No.: 181,798

[22] Filed: Jan. 18, 1994

[51] Int. Cl.$^6$ .......................... C02F 1/00; B01D 37/00
[52] U.S. Cl. .................................. 210/741; 210/791; 210/90
[58] Field of Search ................ 210/741, 709, 791, 90, 210/107, 108; 73/61.63

[56] References Cited

U.S. PATENT DOCUMENTS

| | | | |
|---|---|---|---|
| 3,262,878 | 7/1966 | Beckley et al. | 210/709 |
| 4,439,325 | 3/1984 | Blais | 210/741 |
| 4,514,306 | 4/1985 | Pato | 210/741 |
| 4,855,062 | 8/1989 | Oelbermann | 210/741 |

*Primary Examiner*—Robert A. Dawson
*Assistant Examiner*—Robert James Popovics
*Attorney, Agent, or Firm*—Leydig, Voit & Mayer, Ltd.

[57] ABSTRACT

The present invention provides a method of filtering a fluid comprising (a) passing a first portion of a contaminated fluid through a filtration system comprising a first filtration medium of a preselected surface area which removes contaminants from the first portion of the fluid, (b) simultaneously passing a second portion of the contaminated fluid through a monitoring system comprising a second filtration medium of a preselected surface area which removes contaminants from the second portion of the fluid, wherein the first and second filtration media are the same except that the surface area of the first filtration medium is greater than the surface area of the second filtration medium, and wherein the rate at which the second portion of the contaminated fluid passes through the second filtration medium per unit of surface area of the filtration medium is greater than the rate at which the first portion of the contaminated fluid passes through the first filtration medium per unit of surface area of the filtration medium, (c) determining the quantity of fluid passed through the second filtration medium per unit of surface area of the second filtration medium from the commencement of fluid flow therethrough until an increase in pressure drop is observed across the second filtration medium, and (d) terminating the passage of the first portion of the contaminated fluid through the first filtration medium before the quantity of fluid passed therethrough per unit of surface area of the first filtration medium exceeds the quantity of fluid passed through the second filtration medium per unit of surface area of the second filtration medium resulting in an increased pressure drop.

17 Claims, No Drawings

FILTRATION METHOD USING A RELATIVE PRESSURE DROP TO INITIATE BACKWASH

TECHNICAL FIELD OF THE INVENTION

The present invention relates generally to methods for filtering fluids during processing and relates specifically to methods for filtering liquids such as beer and wine.

BACKGROUND OF THE INVENTION

Many fluids with varying contaminant levels, such as encountered in batch processing, are processed by passing them though filtration media. The producers of beer and wine, for example, typically subject their products to filtration during processing in order to provide such products with an acceptable level of purity. Economics dictate that devices used to conduct such filtration not only provide a product with the desired purity, but that they do so at a commercially feasible rate. As such, most mass producers of beer and wine employ a large number of filters which are integrated so as to form a filtration system. By way of example, a typical system for filtering beer may incorporate about 320 individual filter cartridges connected in parallel to a common feed stream of contaminated beer. Each such cartridge in the system, which comprises one or more pleated, microporous nylon or polyvinylidene fluoride membranes within a plastic or metal housing, is designed to filter about 50–100 gallons of liquid per minute.

When a fluid is being filtered by such a filtration system, the pressure drop across each filter is initially generally stable and remains generally invariant at that level for a substantial period of time. As passage of the liquid through the filter continues, however, the pressure drop across the filter rapidly increases as a result of the build-up of contaminants, e.g., bacteria and particulate matter, on the filter. At some point, the pressure drop becomes so great that the filter must be replaced. While such contaminant-loaded filters may be regenerated by backflushing and thereafter reused, it is generally recognized that once a filter has reached the condition where the pressure drop across the filter has increased over the previously described initial level, even by only about 1 or 2 psi, such backflushing will not completely remove the contaminants so as to restore the initial pressure drop across the filter. This incomplete contaminant removal is undesirable inasmuch as such backwashed filters, possessing a lower overall contaminant loading capacity, must be changed on an increasingly more frequent basis as compared to new or completely contaminant-free filters. This results in higher production costs due to increased system down-time.

It has been recognized, however, that substantially complete removal of contaminants from a filter can be achieved if backflushing is completed on a filter which has not experienced the aforesaid increase in pressure drop from its initial, stable level. Due to the rapidity of the pressure drop increase once the pressure drop begins to increase above the generally invariant initial level, it has been difficult to monitor the pressure drop and stop the filtration process immediately preceding the pressure drop increase. In view of these factors, operators of such systems typically estimate the time it will take for the pressure drop across the filters to increase above their initial levels, such estimates being based purely upon the prior personal experience of the operator in using identical filters. Using this information, and in order to provide an adequate level of safety, an operator will typically replace the filters after they have been in use about 50%, and possibly as high as 70%, of the total time the operator believes it will take for the pressure drop across the filters to increase from their initial level.

Certain inefficiencies, however, arise when using the aforesaid estimating method. One of these inefficiencies is that the filters are replaced prematurely, resulting in unnecessary down-time and increased production costs. Further problems are introduced when one desires to filter beer and wine, or other products, prepared by batch production methods. For example, in the case of beer and wine, the level of contaminant loading of each batch, despite the efforts of its producer, will not only vary from batch to batch, but is difficult to determine with precision in a commercial setting. As filters typically used in such filtration systems possess sufficient capacity (even when replaced prematurely as described previously) to filter more than one batch of beer or wine before requiring replacement, the uncertain level of contaminant loading of each batch, combined with the variation in such loading from batch to batch, introduces further uncertainty and potential error into the aforesaid estimation method. In such filtration systems, the operator will tend to be even more conservative as to deciding when the filters should be cycled, thereby introducing a further degree of inefficiency into the filtration process.

Accordingly, there exists a need for a method which provides for the operation of a filtration system involving the cycling of filters in a manner which is more efficient than known methods. Further, the method should be operable regardless of any variation in, or knowledge of, the degree of contamination of the fluid to be filtered. These and other objects and advantages of the present invention, as well as additional inventive features, will be apparent from the description of the invention provided herein.

BRIEF SUMMARY OF THE INVENTION

The present invention provides a method of filtering a fluid comprising (a) passing a first portion of a contaminated fluid through a filtration system comprising a first filtration medium of a preselected surface area which removes contaminants from the first portion of the fluid, (b) simultaneously passing a second portion of the contaminated fluid through a monitoring system comprising a second filtration medium of a preselected surface area which removes contaminants from the second portion of the fluid, wherein the first and second filtration media are the same except that the surface area of the first filtration medium is greater than the surface area of the second filtration medium, and wherein the rate at which the second portion of the contaminated fluid passes through the second filtration medium per unit of surface area of the filtration medium is greater than the rate at which the first portion of the contaminated fluid passes through the first filtration medium per unit of surface area of the filtration medium, (c) determining the quantity of fluid passed through the second filtration medium per unit of surface area of the second filtration medium from the commencement of fluid flow therethrough until an increase in pressure drop is observed across the second filtration medium, and (d) terminating the passage of the first portion of the contaminated fluid through the first filtration medium before the quantity of fluid passed therethrough per unit of surface area of the first filtration medium exceeds the quantity of fluid passed through the second filtration medium per unit of surface area of the second filtration medium resulting in an increased pressure drop.

DESCRIPTION OF THE PREFERRED EMBODIMENTS

The present invention provides an improved method of filtering fluids, particularly those with varying contaminant levels, such as those prepared in batch processes. In particular, the present inventive method enables a filtration medium to be more effectively utilized in a filtration process by ensuring that the filtration medium is utilized to substantially its maximum extent without being overutilized such that the filtration medium cannot be backwashed and substantially returned to its initial state.

The present invention essentially involves filtering a contaminated fluid through a filtration medium while, at the same time, passing a portion of that fluid at a faster rate through the same type of filtration medium on a smaller scale. The pressure drop increase observed in the smaller scale filtration process is then used to determine the most efficient point to terminate the primary filtration process and regenerate the primary filtration medium by, for example, backwashing. In this manner, a filtration medium can remain in service for as long a time as possible while still ensuring that the filtration medium can be fully regenerated, i.e., returned to substantially new condition as regards the pressure drop across the filtration medium.

Specifically, the present inventive method of filtering a fluid comprises:

(a) passing a first portion of a contaminated fluid through a filtration system comprising a first filtration medium of a preselected surface area which removes contaminants from the first portion of the fluid, (b) simultaneously passing a second portion of the contaminated fluid through a monitoring system comprising a second filtration medium of a preselected surface area which removes contaminants from the second portion of the fluid, wherein the first and second filtration media are the same except that the surface area of the first filtration medium is greater than the surface area of the second filtration medium, and wherein the rate at which the second portion of the contaminated fluid passes through the second filtration medium per unit of surface area of the filtration medium is greater than the rate at which the first portion of the contaminated fluid passes through the first filtration medium per unit of surface area of the filtration medium, (c) determining the quantity of fluid passed through the second filtration medium per unit of surface area of the second filtration medium from the commencement of fluid flow therethrough until an increase in pressure drop is observed across the second filtration medium, and (d) terminating the passage of the first portion of the contaminated fluid through the first filtration medium before the quantity of fluid passed therethrough per unit of surface area of the first filtration medium exceeds the quantity of fluid passed through the second filtration medium per unit of surface area of the second filtration medium resulting in an increased pressure drop.

The first filtration medium is the filtration medium used to treat the bulk of the contaminated fluid and, thus, can be thought of as the production filtration medium. The second filtration medium is used for the purpose of monitoring the production filtration medium and, thus, can be thought of as the test filtration medium. Any fluid which passes through the test filtration medium will typically be incidental to the fluid being treated overall. Since the production and test filtration media are of the same construction, however, the test filtration medium is a reliable predictor of the performance of the production filtration medium.

The contaminated fluid may be any fluid suitable for filtration, although the present invention is particularly useful in treating different batches of a fluid, or two or more different fluids, especially those possessing differing contamination levels and those wherein the complexity of the fluids and/or the contaminants therein render the prediction of suitable filter life impracticable. The present inventive method is especially well-suited to treating fermented liquids, such as beer and wine, particularly in view of the typical batch processing of such products. Moreover, even if the fluids to be filtered have never been filtered before, or if the level of contamination is unknown, the present invention nevertheless advantageously allows an operator the ability to relatively precisely determine the point in time at which flow to the filtration system should be desirably terminated, without interrupting the overall processing of the fluids.

The first filtration medium may be any suitable filtration medium and may be a single filtration medium, but, more typically, will be present in the form of multiple filter media in individual housings connected in parallel, e.g., multiple cartridge filter elements. While the second filtration medium may also comprise any suitable filtration medium, it will advantageously comprise as small, and as inexpensive, a filtration medium as reasonably practicable. For example, the surface area of the second filtration medium is preferably less than about 5%, and more preferably less than 1%, and most preferably less than 0.5%, of the surface area of the first filtration medium. In the situation wherein the first filtration medium comprises multiple filter media in individual housings, e.g., 320 cartridge filter elements, the second filtration medium preferably comprises a single such filter medium in an individual housing, e.g., one cartridge filter element, or even a single such filter medium of reduced surface area in an individual housing, e.g., a one-third size cartridge filter element.

The rate at which the second portion of the contaminated fluid passes through the second filtration medium per unit of surface area should be sufficiently greater than the rate at which the first portion of the contaminated fluid passes through the first filtration medium of the filtration system per unit of surface area so as to enable the determination of the quantity of fluid passed through the second filtration medium per unit of surface area of the second filtration medium from the commencement of fluid flow therethrough until an increase in pressure drop is observed across the second filtration medium and the utilization of that information, e.g., advantageously through control means, to terminate the passage of the first portion of the contaminated fluid through the first filtration medium. Preferably, the rate at which the second portion of the contaminated fluid passes through the second filtration medium per unit of surface area is at least about 50%, more preferably at least about 100%, and most preferably at least about 200%, greater than the rate at which the first portion of the contaminated fluid passes through the first filtration medium of the filtration system per unit of surface area.

The second portion of the contaminated fluid will be generally passed through the second filtration medium beginning simultaneously with, e.g., within a few minutes of, the beginning of the passage of the first portion of the contaminated fluid through the first filtration medium. As the second portion of the contaminated fluid passes through the second filtration medium, the pressure drop across the second filtration medium, i.e., the difference in pressure on the upstream and downstream sides of the second filtration medium, should be monitored at least periodically and preferably continuously. Such can be accomplished using any suitable monitoring means, as is well known in the art.

The pressure drop associated with a new (i.e., previously unused) filtration medium which will be experienced during the initial, i.e., steady-state, operation of the system is referred to herein as the initial pressure drop. When a particular increase in pressure drop over the initial level is detected with respect to the second filtration medium, e.g., about 1 or 2 psi, a determination is made of the total quantity of fluid passed through the second filtration medium per unit of surface area of the second filtration medium from the commencement of fluid flow therethrough until the increase in pressure drop is observed across the second filtration medium. In other words the total fluid quantity through the second filtration medium (Q2) is divided by the surface area of the second filtration medium (S2). This value is then multiplied by the surface area of the first filtration medium (S1) to provide the quantity of fluid flowing through the first filtration medium which will cause an increase in the pressure drop across the first filtration medium (i.e., $Q1 = Q2 \times S1/S2$). The passage of fluid through the filtration system should therefore be terminated prior to the time the aforesaid quantity (Q1) is passed through the filtration system. The foregoing flow determinations are advantageously made using control means, the selection and use of which are well known to those of ordinary skill in the art.

The passage of the first portion of the contaminated fluid through the first filtration medium can be terminated after the quantity of fluid passed therethrough per unit of surface area of the first filtration medium exceeds any particular value below the quantity of fluid passed through the second filtration medium per unit of surface area of the second filtration medium resulting in an increased pressure drop. The passage of the first portion of the contaminated fluid through the first filtration medium is terminated after the quantity of fluid passed therethrough per unit of surface area of the first filtration medium preferably exceeds about 75%, more preferably about 85%, and most preferably about 90%, of the quantity of fluid passed through the second filtration medium per unit of surface area of the second filtration medium resulting in an increased pressure drop. Ideally, the passage of the first portion of the contaminated fluid through the first filtration medium is terminated when the quantity of fluid passed therethrough per unit of surface area of the first filtration medium is very near the quantity of fluid passed through the second filtration medium per unit of surface area of the second filtration medium resulting in an increased pressure drop.

Similarly, the passage of the first portion of the contaminated fluid through the first filtration medium should be terminated before the quantity of fluid passed therethrough per unit of surface area of the first filtration medium exceeds the quantity of fluid passed through the second filtration medium per unit of surface area of the second filtration medium resulting in an increased pressure drop. Preferably the passage of the first portion of the contaminated fluid through the first filtration medium should be terminated before the quantity of fluid passed therethrough per unit of surface area of the first filtration medium exceeds about 98%, more preferably about 95%, and most preferably about 92%, of the quantity of fluid passed through the second filtration medium per unit of surface area of the second filtration medium resulting in an increased pressure drop.

The present inventive method also comprises the additional processing steps of backwashing the first filtration medium after the termination of fluid flow through the first filtration medium, replacing the second filtration medium with an unused identical filtration medium, and then repeating the filtration method, preferably until such time that the first filtration medium is desirably replaced rather than regenerated.

While this invention has been described with an emphasis upon preferred embodiments, it will be obvious to those of ordinary skill in the art that variations of the preferred methods may be used and that it is intended that the invention may be practiced otherwise than as specifically described herein. Accordingly, this invention includes all modifications encompassed within the spirit and scope of the invention as defined by the following claims.

What is claimed is:

1. A method of filtering a fluid comprising:
   (a) passing a first portion of a contaminated fluid through a filtration system comprising a first filtration medium of a preselected surface area which removes contaminants from the first portion of the fluid,
   (b) simultaneously passing a second portion of the contaminated fluid through a monitoring system comprising a second filtration medium of a preselected surface area which removes contaminants from the second portion of the fluid, wherein said first and second filtration media are the same except that the surface area of the first filtration medium is greater than the surface area of said second filtration medium, and wherein the rate at which said second portion of the contaminated fluid passes through said second filtration medium per unit of surface area of said filtration medium is greater than the rate at which said first portion of the contaminated fluid passes through said first filtration medium per unit of surface area of said filtration medium,
   (c) determining the quantity of fluid passed through said second filtration medium per unit of surface area of said second filtration medium from the commencement of fluid flow therethrough until an increase in pressure drop is observed across said second filtration medium, and
   (d) terminating the passage of said first portion of the contaminated fluid through said first filtration medium before the quantity of fluid passed therethrough per unit of surface area of said first filtration medium exceeds said quantity of fluid passed through said second filtration medium per unit of surface area of said second filtration medium resulting in an increased pressure drop.

2. The method of claim 1, wherein the contaminated fluid is comprised of at least two batches possessing different contamination levels.

3. The method of claim 2, wherein the contaminated fluid comprises beer or wine.

4. The method of claim 3, wherein the contaminated fluid is beer.

5. The method of claim 4, wherein said first filtration medium comprises multiple filter elements connected in parallel and said second filtration medium comprises a single filter element.

6. The method of claim 1, wherein the passage of said first portion of the contaminated fluid through said first filtration medium is terminated after the quantity of fluid passed therethrough per unit of surface area of said first filtration medium exceeds about 75% of said quantity of fluid passed through said second filtration medium per unit of surface area of said second filtration medium resulting in an increased pressure drop.

7. The method of claim 6, wherein the passage of said first portion of the contaminated fluid through said first filtration medium is terminated before the quantity of fluid passed therethrough per unit of surface area of said first filtration medium exceeds about 95% of said quantity of fluid passed through said second filtration medium per unit of surface area of said second filtration medium resulting in an increased pressure drop.

8. The method of claim 7 which further comprises backwashing said first filtration medium after the termination of fluid flow through said first filtration medium, replacing said second filtration medium with an unused identical filtration medium, and then repeating said method.

9. The method of claim 6, wherein the passage of said first portion of the contaminated fluid through said first filtration medium is terminated after the quantity of fluid passed therethrough per unit of surface area of said first filtration medium exceeds about 85% of said quantity of fluid passed through said second filtration medium per unit of surface area of said second filtration medium resulting in an increased pressure drop.

10. The method of claim 9, wherein the passage of said first portion of the contaminated fluid through said first filtration medium is terminated after the quantity of fluid passed therethrough per unit of surface area of said first filtration medium exceeds about 90% of said quantity of fluid passed through said second filtration medium per unit of surface area of said second filtration medium resulting in an increased pressure drop.

11. The method of claim 1, wherein the rate at which said second portion of the contaminated fluid passes through said second filtration medium per unit of surface area is at least about 50% greater than the rate at which said first portion of the contaminated fluid passes through said first filtration medium of the filtration system per unit of surface area.

12. The method of claim 11, wherein the rate at which said second portion of the contaminated fluid passes through said second filtration medium per unit of surface area is at least about 100% greater than the rate at which said first portion of the contaminated fluid passes through said first filtration medium of the filtration system per unit of surface area.

13. The method of claim 12, wherein the contaminated fluid is beer or wine and is comprised of at least two batches possessing different contamination levels.

14. The method of claim 1 which further comprises backwashing said first filtration medium after the termination of fluid flow through said first filtration medium, replacing said second filtration medium with an unused identical filtration medium, and then repeating said method.

15. The method of claim 1, wherein said surface area of said second filtration medium is less than about 10% of said surface area of said first filtration medium.

16. The method of claim 15, wherein said surface area of said second filtration medium is less than about 1% of said surface area of said first filtration medium.

17. The method of claim 16, wherein said surface area of said second filtration medium is less than about 0.5% of said surface area of said first filtration medium.

* * * * *